United States Patent [19]
Maidment

[11] Patent Number: 5,694,822
[45] Date of Patent: *Dec. 9, 1997

[54] APPARATUS FOR TRIMMING CAN BODIES

[75] Inventor: Wallace E. Maidment, Chesterfield County, Va.

[73] Assignee: Reynolds Metals Company, Richmond, Va.

[*] Notice: The term of this patent shall not extend beyond the expiration date of Pat. No. 5,697,274.

[21] Appl. No.: 524,935

[22] Filed: Sep. 8, 1995

Related U.S. Application Data

[63] Continuation of Ser. No. 107,682, Aug. 16, 1993, abandoned.

[51] Int. Cl.$^6$ ............................................. B23D 21/00
[52] U.S. Cl. ........................... 83/114; 83/54; 83/115; 83/186
[58] Field of Search ........................ 83/54, 114, 137, 83/185, 186, 914, 115, 150; 82/58

[56] References Cited

U.S. PATENT DOCUMENTS

| | | |
|---|---|---|
| 2,298,366 | 10/1942 | Gladfelter et al. |
| 2,526,163 | 10/1950 | Shippy et al. |
| 3,359,841 | 12/1967 | Cvacho et al. |
| 3,364,709 | 1/1968 | Scann ............................ 72/71 |
| 3,400,620 | 9/1968 | Armbruster et al. ............ 82/47 |
| 3,581,691 | 6/1971 | Ringler ........................ 83/54 X |
| 3,756,103 | 9/1973 | Cvacho et al. ............... 82/101 |
| 3,802,364 | 4/1974 | Paramonoff ................ 72/361 X |
| 3,864,995 | 2/1975 | Langewis ..................... 82/54 |
| 3,894,455 | 7/1975 | Stroobants .................... 82/58 |
| 3,972,299 | 8/1976 | Hasselbeck et al. ....... 83/54 X |
| 3,994,251 | 11/1976 | Hake et al. ................ 82/101 X |
| 4,022,089 | 5/1977 | Bulso, Jr. et al. ......... 83/137 X |
| 4,062,311 | 12/1977 | Zugcic et al. ............... 83/54 X |
| 4,341,103 | 7/1982 | Escallon et al. ............... 72/70 |
| 4,489,584 | 12/1984 | Gall et al. ................... 72/327 |
| 4,510,830 | 4/1985 | Post ............................ 83/114 |
| 4,843,930 | 7/1989 | Ashbolt ........................ 83/39 |
| 4,914,990 | 4/1990 | Hellweg et al. ............... 82/54 |

FOREIGN PATENT DOCUMENTS

| | | |
|---|---|---|
| 0648566 | 4/1995 | European Pat. Off. |
| 2298395 | 8/1976 | France. |
| 2332844 | 6/1977 | France. |
| 1096316 | 7/1961 | Germany. |
| 2218396 | 10/1973 | Germany. |
| 2401474 | 8/1974 | Germany. |
| 2548472 | 5/1977 | Germany. |
| 1268968 | 3/1972 | United Kingdom. |

*Primary Examiner*—Eugenia Jones
*Attorney, Agent, or Firm*—Robert C. Lyne, Jr.

[57] ABSTRACT

Apparatus for trimming cylindrical cans wherein each can is orbited about a central turret axis while being rotated about its longitudinal can axis is disclosed. The cans are successively mounted with vacuum onto a support mandrel located on a support shaft within each of plural cartridge assemblies mounted at circumferentially spaced intervals on a turret disk. The can is firmly secured to the mandrel by vacuum so that the open end portion of the can body projects between an outside circular cutting knife and an inside trimming edge disposed within the open end. As the cartridge orbits about the turret axis while rotating on the shaft axis, the inside trimming edge is radially displaced by camming action into contact with the open end portion of the can body and the outside cutting edge to generate cutting forces for trimming the portion. This trimming occurs as the inside trimming edge is maintained radially closer to the turret axis than the can body and the outside cutting edge which remain centered on the cartridge axis. By locating the can supporting mandrel on the cartridge shaft, set-up of trim height and trim quality is self-contained within the cartridge which allows for set-up and quality verification in the tool room before the cartridge is placed in a production machine.

27 Claims, 7 Drawing Sheets

APPARATUS FOR TRIMMING CAN BODIES

This application is a continuation of application Ser. No. 08/107,862 filed Aug. 16, 1993, now abandoned.

TECHNICAL FIELD

The present invention relates generally to trimming an annulus from an open end of a cylindrical side wall of a can body such that the open end terminates in one plane and, more particularly, to the use of inner and outer shearing elements and the manner in which they coact to generate cutting forces for trimming the can.

BACKGROUND ART

In plants for manufacturing one-piece beverage containers, a trimmer immediately follows a draw and iron press used to form the can body. The purpose of the trimmer is to cut off a small portion or annulus (e.g., ¼ inch in axial dimension) of the open end of the can body so as to provide a side wall having a uniform height and a smooth, uniform edge residing in the same axial plane. The scrap produced by the trimmer is in the form of a "trim ring." Though simple in principle, the trimming operation is critical, since burrs or other irregularities left on the open edge of the can body wall will produce defective cans downstream in subsequent necking and flanging operations. The complexity of the necking and flanging operations makes it difficult to diagnose such problems as originating in the trimmer. Consequently, keeping the various parts of the trimmer in precise alignment is critical.

All known existing trimmers of which I am aware are similar to lathes, in that the bottom of the can is held by external vacuum to a base pad, while the open end of the can is trimmed by shearing. The shearing may be done against a single sickle knife, or by rotating knives within a cartridge. This means that the base pad must be mounted for axial movement to bring the can to a position where the knives can trim its open end. Such known apparatus are quite complex, and adjustment is difficult and tedious because in the lathe-like arrangement the can must bridge the base pad and the tooling holding the open end of the can for cutting by the knives, whereby these parts of the trimmer are remote from each other in terms of how they support the structure of the trimmer. In actuality, the "lathe" is typically one of a number of stations in a rotating turret. Typically, these turrets rotate about a horizontal axis.

DISCLOSURE OF THE INVENTION

It is accordingly one object of the present invention to trim the open end of the can body without forming burrs or other irregularities on the remaining open edge of the can body wall.

Another object is to trim the open end while supporting the can body on the same structure which supports the trimming elements.

Yet another object is to provide the trimming elements and the can supporting element in the same structure which is a cartridge assembly that may be mounted to a rotating turret at circumferentially spaced intervals to provide for plural trimming stations.

Still a further object is to be able to adjust trim height and trim quality in a self-contained cartridge which allows for set-up and quality verification in the tool room before being placed in production.

Apparatus for trimming a can body along a cylindrical open end thereof, in accordance with the present invention, comprises a support shaft and an annular outer shearing element having an inner diameter greater than the outer diameter of the can body open end. A cylindrical inner shearing element having an outer diameter less than the inner diameter of the can body open end is mounted coaxially around the shaft with the outer shearing element. These elements are sufficiently radially spaced from each other to receive the open end of the can therebetween. A displacement arrangement radially displaces the inner and outer shearing elements in relation to each other and against a portion of the can body defining the open end to thereby shear the can body.

The inner shearing element is preferably formed with a radiused trimming edge and the outer shearing element is formed with a sharp cutting edge. Preferably, the two elements are mounted for co-rotation with the shaft.

To provide a self-contained unit, the apparatus further features a mandrel mounted on the shaft for co-rotatably supporting the can body.

More specifically, the trimming apparatus of the preferred embodiment is a trimmer cartridge assembly, identical ones of which are mounted to a rotating turret disk at circumferentially spaced intervals from each other. Each cartridge assembly includes a cartridge housing having the support shaft projecting therefrom. A cartridge spindle is rotatably mounted through bearings to the housing. A cartridge retainer is mounted to the spindle for connecting the cartridge to the turret disk so that the cartridge assembly co-rotates with the disk about the turret central axis of rotation. A drive gear is mounted for co-rotation with each shaft. The drive gear meshes with a stationary ring gear mounted adjacent the turret to thereby rotate the inner and outer shearing elements together with the shaft about the cartridge shaft axis during orbital rotation of the cartridge about the turret.

The displacement arrangement further includes a penetrator hub mounted on the shaft concentrically about the inner shearing element which is in the form of an inside penetrator having the trimming edge. The penetrator hub includes an outer cylindrical cam follower surface engageable with a cam surface formed on a stationary cam ring mounted adjacent the stationary ring gear. Radial inward displacement of the penetrator hub under camming action causes corresponding radial inward displacement of the trimming edge toward the turret axis so that the trimming edge intersects the can body and overlaps with the outside knife cutting edge to generate cutting forces which trim the can body as the trimming edge is maintained by camming action radially closer to the turret axis than the cutting edge during orbital movement of the cartridge and simultaneous rotation of the trimming and cutting edges about the shaft axis.

In accordance with other features of the invention, the penetrator hub is mounted to the drive gear with plural screws respectively passing through a series of circumferentially spaced first through bores formed in the hub. The screws extend through spacers in the first through bores which permit radial displacement of the hub relative to the shaft axis. The outer shearing element is an outside knife extending around the can body axially forwardly of the penetrator hub. The knife may be mounted around the shaft with the same screws. The spacers serve to axially space the knife cutting edge from the trimming edge of the inside penetrator.

The penetrator hub may also include a second series of through bores alternating between the first through bores to receive a plurality of centering arrangements which serve to center the inside penetrator trimming edge on the shaft axis when camming radial displacement forces are not acting against the penetrator hub. In the preferred embodiment, the centering arrangements respectively comprise a spherical ball and a spring disposed in each second through bore. The spherical ball is operable to project axially slightly from one of the axial faces of the penetrator hub and into a seating bore formed coaxially adjacent the associated second through bore. The spherical balls are normally urged into seating contact with the seating bores by the springs when no radial displacement camming forces are exerted against the penetrator hub. The balls are operable to retract within the second through bores when radial displacement camming forces radially displace the penetrator hub relative to the seating bores. When these camming forces are released from the penetrator hub, the spring biased balls are operable to rapidly re-center the penetrator hub and thereby the trimming edge relative to the shaft axis.

In accordance with another important feature of this invention, a mandrel is mounted to the support shaft for supporting the can body for co-rotation with the shaft. The mandrel avoids the need for separate base pad assemblies. The mandrel allows the cartridge to be self-contained and also facilitates the use of a grindable trim height spacer mounted on the shaft axially between the mandrel and the inner and outer shearing elements. This trim height spacer is operable to control the extent to which the can body open end is trimmed, i.e., trim height. This enables the cartridge assembly to be adjusted and checked within a tool room before being mounted to a production machine.

A series of vacuum passageways may extend through the cartridge spindle and the mounting shaft as well as the mandrel so as to provide vacuum to the bottom face of the mandrel projecting forwardly from the cartridge. This will facilitate secure seating of the can bottom on the mandrel with the can body open end projecting between the inner and outer shearing elements. These shearing elements, when in centered position about the shaft axis, define an ejection slot spaced forwardly from an annular trim ring discharge chamber formed between the inner shearing element and the displacement arrangement. The trimming plane is located at the interface with the ejection slot when the aforesaid radial displacement occurs and the resulting annular trim ring is contained within the discharge chamber after the trimming edge is returned to its inside centered position. A piston ring disposed within the chamber is then actuated with pressurized air to propel the trim ring through the chamber, then toward and through the ejection slot to quickly and easily discharge the trim ring from the apparatus.

The forward end wall defining the front end of the chamber and the entrance to the ejection slot is preferably formed by a pair of oppositely and forwardly inclined inner and outer surfaces which are radially spaced from each other to define the beginning of the ejection slot and such that the trim ring being ejected from the chamber through the slot will be guided by the inclined surfaces. The outer one of these inclined surfaces is formed rearwardly adjacent the cutting edge of the outside knife and preferably has an inner diameter which is slightly less than the inner diameter of the knife cutting edge to prevent the trim ring from contacting and jamming against the cutting edge during forcible ejection.

In accordance with a further feature of the invention, apparatus for trimming a can body along a cylindrical open end thereof comprises a cartridge assembly including a cartridge spindle for mounting the cartridge to a support structure. A support shaft operatively connected to the cartridge spindle through bearings is rotatable relative to the spindle about the shaft axis which defines a trimming axis on the cartridge. First and second elements being respectively formed with a trimming edge and a cutting edge are mounted coaxially around the support shaft and are radially spaced from each other to receive the open end of the can body therebetween. A displacement arrangement for radially displacing the trimming and cutting edges in relation to each other and into a portion of the can body defining the open end to thereby shear the can body is also provided.

This cartridge assembly is preferably mounted to a turret disk through the spindle such that the cartridge assembly is co-rotatable with the turret disk about a turret axis of rotation which is parallel to the cartridge trimming axis. Means is provided for rotating the inner and outer elements about the cartridge shaft axis during orbital rotation of the cartridge about the turret axis.

A method of trimming a cylindrical open end portion of a can body, in accordance with this invention, comprises the steps of directing the cylindrical open end portion in an axial direction so that it is located radially between a pair of inner and outer shearing elements. The inner and outer shearing elements are then radially displaced in relation to each other and against the open end portion of the can body to thereby shear it from the can.

The can body is preferably rotated about the cartridge axis during the aforesaid radial displacement so that the inner and outer shearing elements gradually contact the entire periphery of the open end portion to trim it from the can body. The inner shearing element is preferably formed with a radius trimming edge and the outer shearing element is formed with a knife cutting edge. It is the trimming edge which is preferably radially displaced into contact with the end portion while the can body and knife cutting edge remains centered on a common axis.

In accordance with other method features, the common axis is located on a rotating turret at a fixed radial distance from the turret central axis of rotation. The inner trimming edge is offset during trimming so as to be located radially closer to the turret axis than the can body and the knife cutting edge as the common axis forwardly rotates around the turret axis. By rotating the trimming and cutting edges as well as the can body about the common cartridge axis during orbital rotation about the turret axis while maintaining the trimming edge radially closer to the turret axis in the aforesaid manner, the can is progressively cut.

The radial movement of the inner trimming edge may be controlled by a cam. In accordance with another feature of the method of the this invention, when the radial displacement cam forces are released, the inner trimming edge is quickly returned to a centered position on the common axis by the use of spring-loaded centering balls.

After trimming, the trim ring is forcibly ejected from between the inner trimming edge and outer cutting edge using a forcible ejecting member propelled with compressed air.

In accordance with another method feature, the can body is preferably mounted to a mandrel supported on the common axis. The location of the can body open end portion along this axis may be adjusted by the use of a trim height spacer mounted between the mandrel and the inner and outer elements.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 5A is an enlarged sectional view, partly in schematic form, depicting the cutting interaction between the inner radiussed trimming edge and the outside cutting knife 38;

BEST MODE FOR CARRYING OUT THE INVENTION

Figure 1:
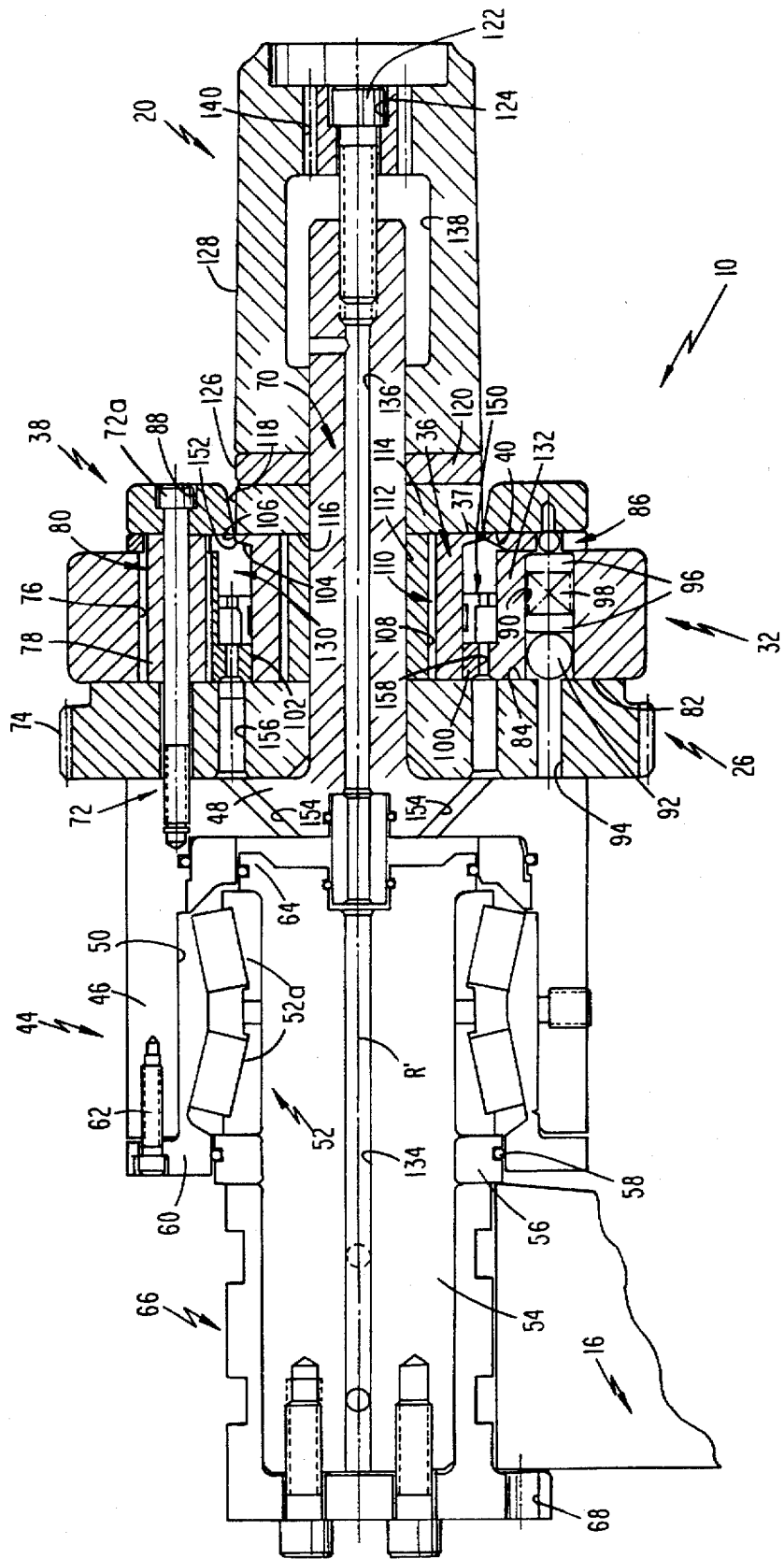
FIG. 1 is a sectional view of a trimmer cartridge assembly in accordance with a preferred embodiment of the present invention.
Figure 2:
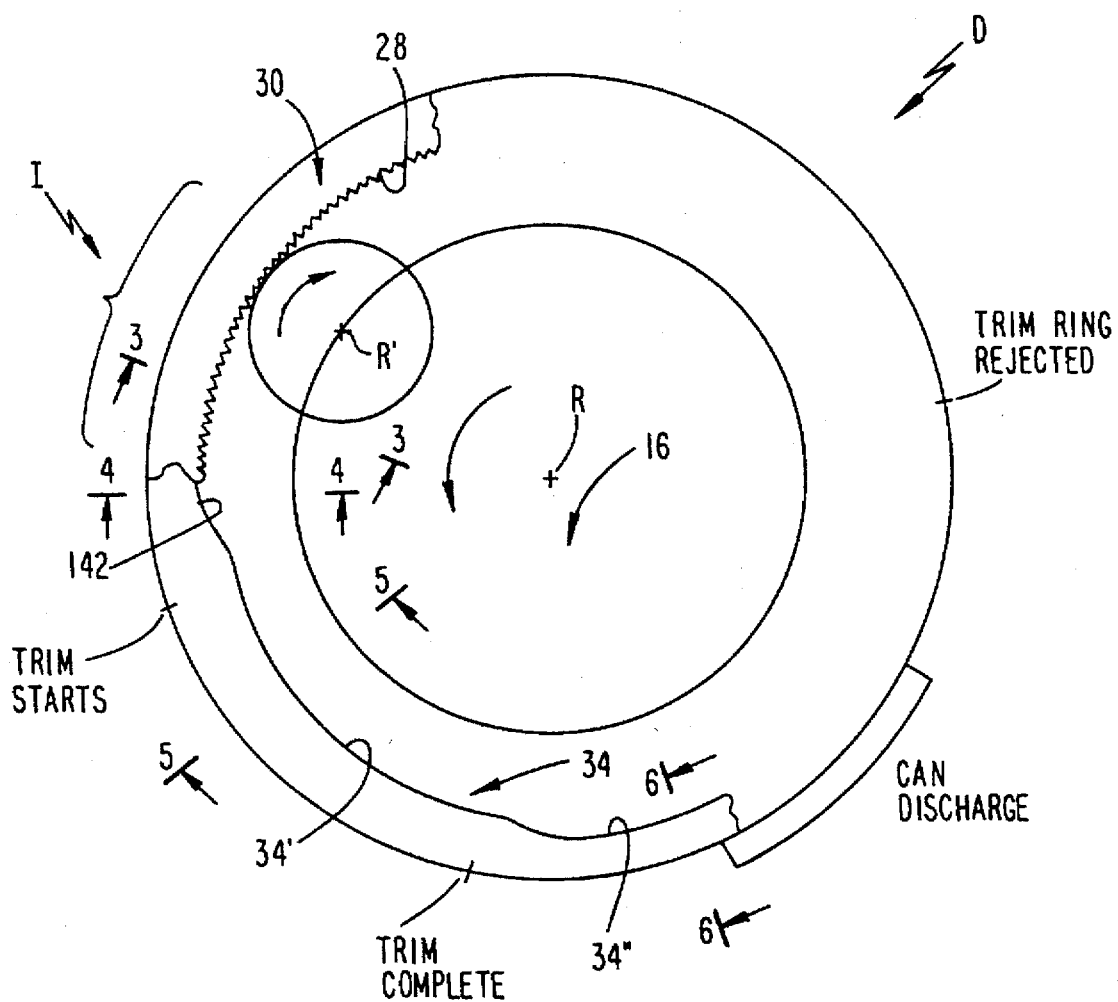
FIG. 2 is a schematic view of a trimming machine incorporating a plurality of identical trimmer cartridge assemblies mounted to a rotating turret disk, only one of which cartridges is depicted for simplicity of drawing.
Figure 3:
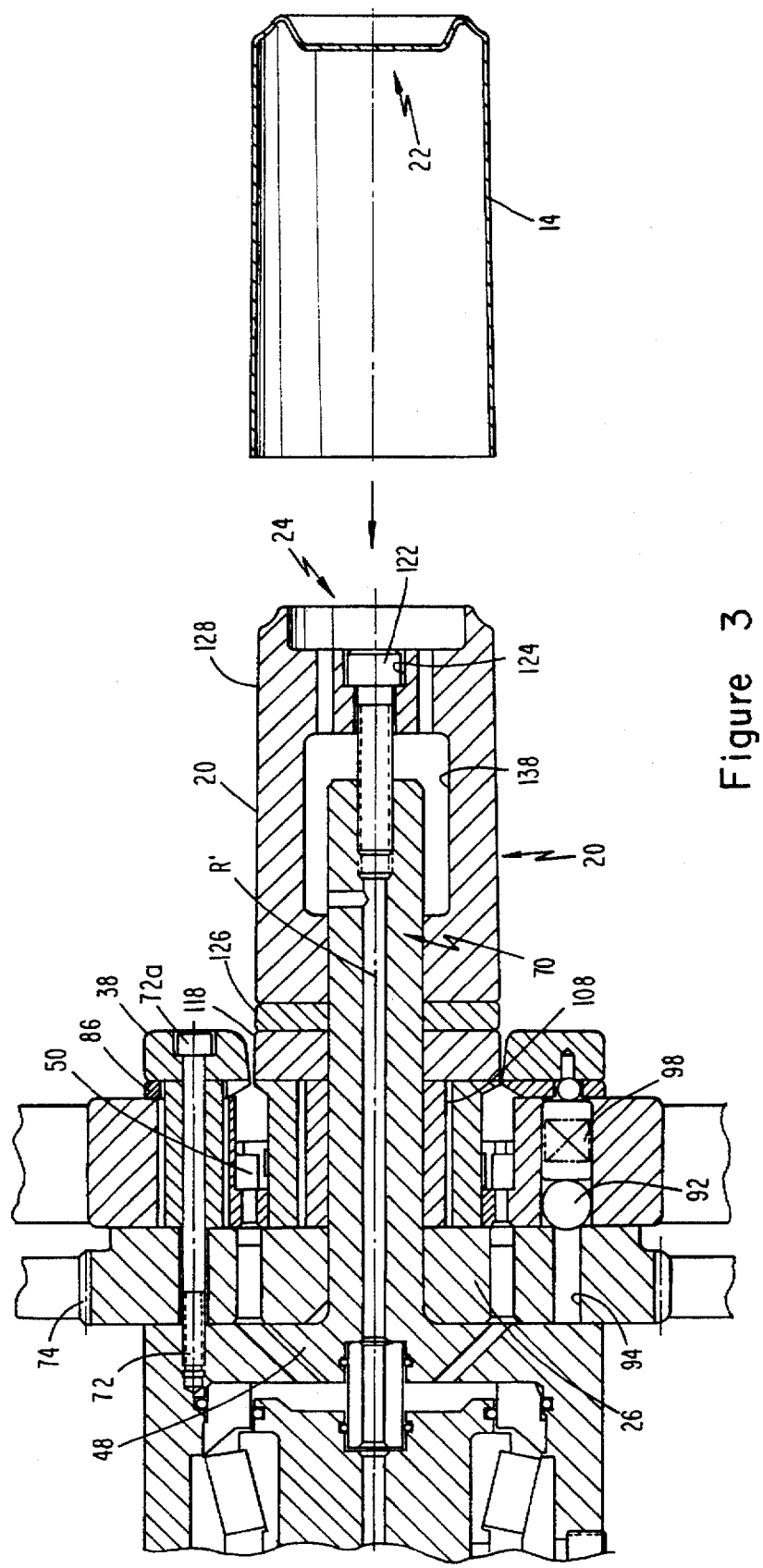
FIG. 3 is a partly sectional and partly schematic sequential view depicting a can body about to be fed onto a trimmer cartridge assembly proximate the sectional line 3—3 of FIG. 2.

Reference is now made to FIGS. 1 through 5 wherein a trimmer cartridge assembly 10 of the invention is depicted for use in circumferentially cutting off the top edge portion 12 (e.g., ¼ inches) defining the open end of a can body 14 so as to provide a side wall having a uniform height and smooth, uniform edge which is free of burrs or other irregularities. As schematically depicted in FIG. 2, a plurality of trimmer cartridge assemblies 10 are mounted at circumferentially spaced intervals to the periphery of a disk turret 16 having a horizontal axis of rotation R. Can bodies 14 which have been formed in a draw and iron press (not shown) in a known manner are respectively and sequentially fed via a star transfer wheel onto one of the trimmer cartridges 10 as the cartridge rotates about axis R to an infeed location I in coaxial alignment with the transfer wheel. In accordance with the unique features described below, the can .body is pushed open end first onto a mandrel 20 (FIG. 3) of the cartridge 10. Vacuum is then applied through the mandrel 20 to firmly seat the can bottom 22 against the mandrel bottom 24 (FIG. 4), thereby eliminating the need for separate base pad assemblies . As the cartridge assemblies 10 respectively rotate about turret axis R, they in turn rotate about their individual horizontal axes of rotation R' (parallel to axis R) as a result of meshing engagement between a cartridge drive gear 26 mounted to each cartridge, with the internal teeth 28 of a large diameter stationary ring gear 30 mounted to a stationary support frame (not shown) adjacent the turret 16. A cam follower or penetrator hub 32 mounted within each cartridge assembly 10 in the unique manner described below is pushed radially inwardly towards the turret axis R as a result of contact with a large diameter stationary cam ring 34 also mounted to the stationary support frame parallel to and adjacent the ring gear 30. Both ring gear 30 and cam 34 are coaxial with axis R. The cam follower 32 actuates an inside penetrator 36 disposed within the cartridge 10 and whose outside diameter is slightly smaller than the inside diameter of the can body 14. In this manner, the inside penetrator 36 is displaced radially inwardly towards turret axis R so that its inside penetrator trimming edge 37 contacts with the can body side wall (FIG. 5) as best depicted in FIG. 5A, this trimming edge is further displaced by cam 34 to radially urge the can body side wall into cutting engagement with an outside cutting knife 38 mounted within the cartridge assembly 10 and whose inside diameter cutting edge 40 is slightly larger than the outside diameter of the can body 14.

As the cartridge 10 rotates about turret axis R along a predetermined arcuate interval, the inside penetrator trimming edge 37 is held by the cam 34 in a radial position r1, relative to turret axis R, which is radially inward of the can body side wall located at a radially innermost position r2, wherein r1<r2. Since the can body 14 and outside cutting knife 38 always co-rotate about the cartridge axis R' in a concentric manner while the inside penetrator trimming edge 37 is radially offset, the open end of the can is gradually trimmed as a result of shearing between the knife and inside penetrator edges 37, 40.

After cutting, the cam follower 32 advances out of radially inward camming contact with the cam ring 34 which allows the radially offset inside penetrator 36 to now be re-centered on the cartridge axis R'. Once re-centered in the unique manner discussed infra, pressurized air is used to rapidly eject the trim ring 12 (FIG. 6) from the cartridge assembly 10 after the trimmed can body has been removed from the mandrel 20 with compressed air onto a discharge star wheel.

Each cartridge assembly 10 includes a cartridge housing 44 having a cylindrical side wall 46 and a bottom wall 48 which defines a cylindrical cavity 50 adapted to receive a pair of roller bearings generally designated with reference numeral 52. A cartridge support spindle 54 in contact with the inner set 52a of roller bearings 52 projects rearwardly from the cavity 50 through a spindle wear ring 56 stationarily mounted on the spindle. Wear ring 56 has an outer O-ring seal 58 in sealing sliding contact with a bearing retainer 60 bolted at 62 to the rear end face of the cylindrical housing side wall 46. The forwardmost end of the cartridge spindle 54 is flanged at 64 to define a step which is captured against the inner roller bearing set 52a to prevent axial withdrawal of the cartridge spindle from the housing 44. The rearwardly projecting end of the spindle 54 supports a cartridge retainer 66 which is used to bolt the cartridge 10 to the periphery of the turret disk 16 as at 68.

The roller bearings 52 are concentrically mounted in relation to the longitudinal axis R of the cartridge spindle 54. In this manner, the non-rotational spindle 54 supports the cartridge assembly 10 on the turret disk 16 while allowing the cartridge housing 44 to rotate coaxially about the cartridge spindle axis R'. This cartridge housing 44 is further formed with a cylindrical support shaft 70 projecting forwardly from the cartridge housing bottom wall 48 in coaxial alignment with the cartridge spindle 54. This support shaft 70 co-rotates with the cartridge housing 44 about axis R' during orbital rotation about turret axis R. To rotate the cartridge assembly 10 about axis R', the cartridge drive gear 26 is mounted on the support shaft 70 in concentric alignment with the cartridge axis R' and secured to the annular forward face of the cartridge housing bottom wall 48 with circumferentially spaced screws 72. The gear teeth 74 of gear 26 are located in meshing contact with the internal gear teeth 28 of the stationary ring gear 30 having a diameter slightly greater than the turret diameter.

The penetrator hub 32 is mounted on the support shaft 70 axially forwardly adjacent the cartridge drive gear 26 for co-rotation therewith. Penetrator hub 32 includes a first series of through holes 76 which are circumferentially spaced from each other and are adapted to respectively receive cylindrical spacers 78 having an outer diameter which is less than the inner diameter of the through hole to define an annular clearance 80 therebetween. The screws 72 which are used to secure the cartridge drive gear 26 to the cartridge housing wall 48 may extend through these spacers 78 to mount the hub. The penetrator hub 32 has a flat rear axial face 82 which is adapted to be in radial sliding contact with the flat front face 84 of the cartridge drive gear 26, when the aforesaid camming movement occurs, as a result of precise axial positioning achieved with the spacers 78.

A trim ring locator spacer 86 is mounted with the screws 72 to engage the front axial face of the penetrator hub 32. The outside cutting knife 38 is in turn mounted axially forwardly adjacent the trim ring locator spacer 86 which serves to precisely locate the outside cutting edge 40 in the same shearing plane with inside trimming edge 37. The screw head 72a of each screw 72 is captured within a countersunk bore 88 formed in the front face of the knife 38.

A second series of axial through bores 90 are formed in the penetrator hub 32 at circumferentially spaced intervals from each other in alternating relation with the first through bores 76. These second though bores 90 are concentrically arrayed about cartridge axis R' and may be of smaller diameter than the first through bores 76. A spherical ball 92 in each bore 90 is spring-biased to protrude rearwardly from the rear face 82 of the penetrator hub 32 into normal seating contact with a smaller diameter seating through bore 94 in the drive gear 26 in coaxial alignment therewith. The spring mechanism comprises a pair of spring pads 96 with a compressed spring 98 therebetween located in a forward portion of the second through bore 90 which urges the steel ball 92 into the aforesaid seating contact. When properly seated in these seating bores 94, the penetrator hub 32 is precisely concentrically mounted on the support shaft 70 which in turn centers the inside penetrator 36. Radial displacement of the penetrator hub 32 by the cam 34 causes the steel balls 92 to completely retract within the second through bores 90 as they are offset out of coaxial alignment with the seating bores 94 when the rear face 82 of the penetrator hub slides in the radially inward direction A against the stationary front face 84 of the cartridge drive gear 26. When the cam surface 34 returns to a neutral position in concentric alignment with the turret axis R, the spring biased balls 92 quickly and positively re-center the penetrator hub 32 on the support shaft 70 as a result of spring biased re-seating of the balls within the seating bores 94.

The penetrator hub 32 is further formed with a stepped center portion 100 defining a central opening 102 through which projects the inside penetrator 36, in contact therewith. As a result, the inside penetrator 36 is normally centered on the support shaft 70 through the spring-loaded centering balls 92. The inside penetrator 36 is a generally cylindrical member of constant inner and outer diameter, except at the front end thereof which is of larger diameter as defined by a frusto-conical surface 104 flaring radially outwardly towards the trim ring locator spacer 86 and which terminates in an axially extending outer cylindrical surface 106. The surface 106 terminates at the front axial face of the inside penetrator 36 to define therewith the inside trimming edge 37 which is slightly spaced rearwardly from and parallel to the axial plane of the outside knife cutting edge 40.

The inner cylindrical surface 108 of the inside penetrator 36 forms an annular clearance 110 with a cylindrical spacer 112 concentrically mounted to the support shaft 70. This inside penetrator spacer 112 cooperates with the penetrator hub spacers 78 by contacting the rear face of a penetrator retainer 114 to establish a predetermined axial spacing between the trimming edge 37 and the cartridge drive gear 26 so as to allow for smooth sliding, radially inward movement of the penetrator hub 32 and inside penetrator 36 during the aforesaid camming displacement, while ensuring that surfaces 37, 40 slide past each other in a shearing plane.

The penetrator retainer 114 is in the form of a substantially cylindrical plate-shaped member which is concentrically mounted on the support shaft 70 forwardly adjacent the inside penetrator 36 and the penetrator spacer 112. More specifically, the flat rear face 116 of the penetrator retainer 114 is in abutting contact with the front end faces of both the inside penetrator and the penetrator spacer. The outer annular surface 118 of the penetrator retainer 114 is tapered in the forward direction to form a continuous surface with the axially extending large diameter surface 106 formed in the front end portion of the inside penetrator 36 to allow the can open end to slide easily between the trim ring locator spacer 86 and the inside penetrator as the can body is being seated by vacuum on the mandrel 20.

In accordance with a unique feature of this invention, a grindable trim height spacer 120 is concentrically mounted on the support shaft 70 forwardly adjacent the penetrator retainer 114. The substantially cylindrical mandrel 20 is in turn mounted on the support shaft 70 to extend forwardly adjacent from the trim height spacer 120. A cap screw 122 received in a countersink 124 in the front face of mandrel 20 is adapted to clamp the assembly of the mandrel, grindable spacer, penetrator retainer and inside penetrator to the support shaft 70 in that order. The outer cylindrical surfaces 118, 126 and 128 of the penetrator retainer 114, trim height spacer 120 and mandrel 20, respectively, are tapered in the forward direction to enable the can body side wall to be smoothly guided by these surfaces onto the mandrel so the inside surfaces of the can body bottom may seat firmly against the forward end of the mandrel under the action of vacuum supplied through the mandrel as described more fully below. In this seated position (FIG. 4), the open end of the can body side wall extends axially rearwardly past the forward portion 104 of the inside penetrator 36 (now disposed within the can body open end) and into an annular cavity 130 formed between the constant diameter portion of the inside penetrator 36 and a constant diameter portion 132 of the penetrator hub 32 defining the forward extent of the hub center opening 102.

Figure 4:
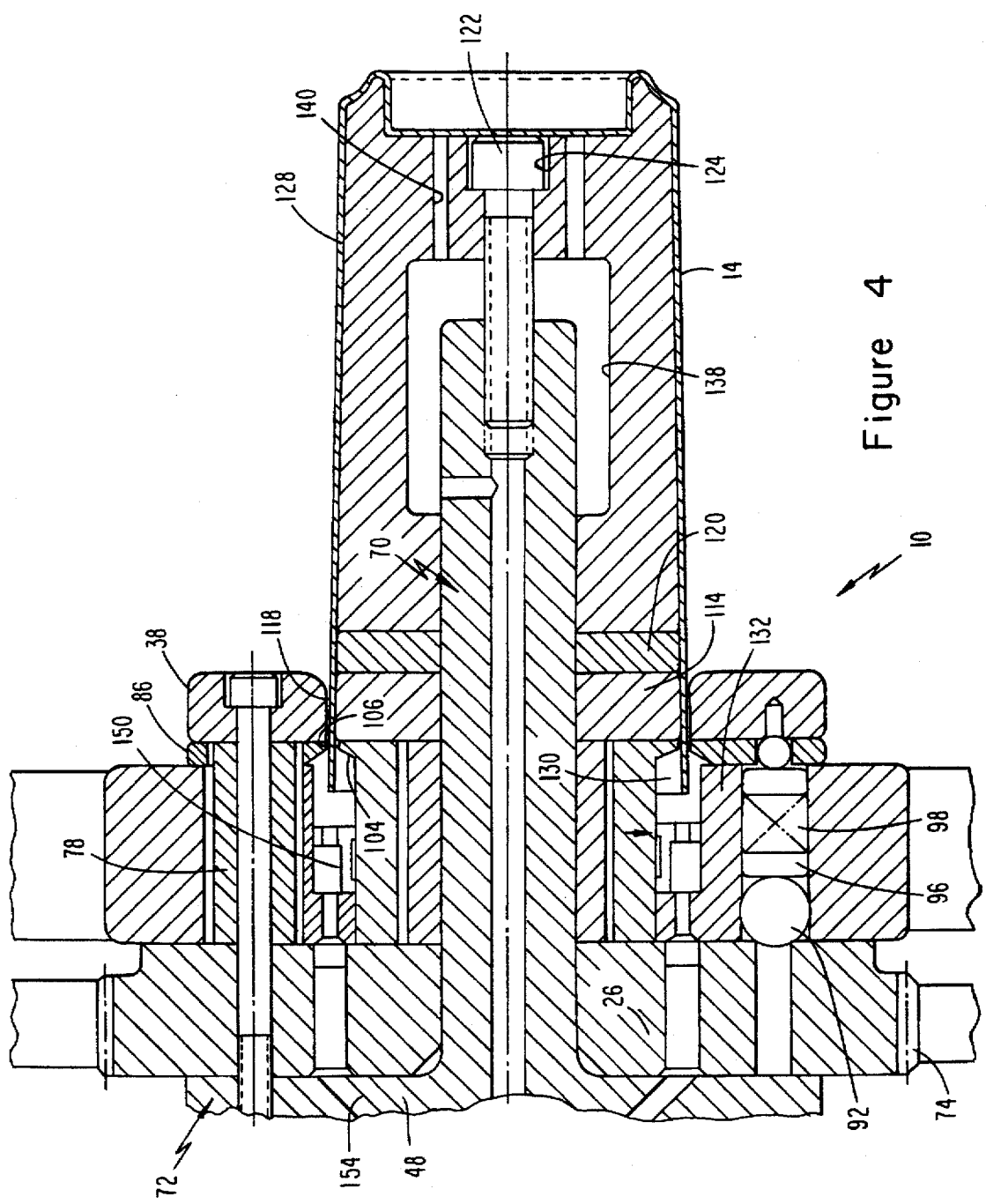
FIG. 4 is a sequential view similar to FIG. 3 but depicting the untrimmed can body seated within the cartridge assembly in a location proximate sectional line 4—4 of FIG. 2.

The operating sequence for trimming the open end of a can body with a trimmer cartridge of this invention will now be explained. As previously mentioned, the untrimmed can body 14 is initially fed onto one of the mandrels 20 of a trimmer cartridge 10 as the mandrel rotates about turret axis R through infeed location I (FIG. 2) in coaxial alignment with the can body being fed to it with a star transfer wheel 18. When the can body 14 is coaxial with the cartridge axis R', vacuum is supplied from an external vacuum source through a series of connected longitudinally extending vacuum passageways 134 and 136 in the cartridge spindle 54 and support shaft 70, respectively, which communicate with the front end face of the mandrel 20 through a vacuum chamber 138 and a plurality of short vacuum passageways 140 to rapidly suck the can onto the mandrel until the can bottom is firmly seated against the front face of the mandrel (FIG. 4). The open end of the can body now projects axially rearwardly into chamber 130, i.e., past the outside knife 38 and the inside penetrator trimming surface 37 which are maintained in a centered position with the spring-loaded centering ball arrangements 92.

Figure 5:
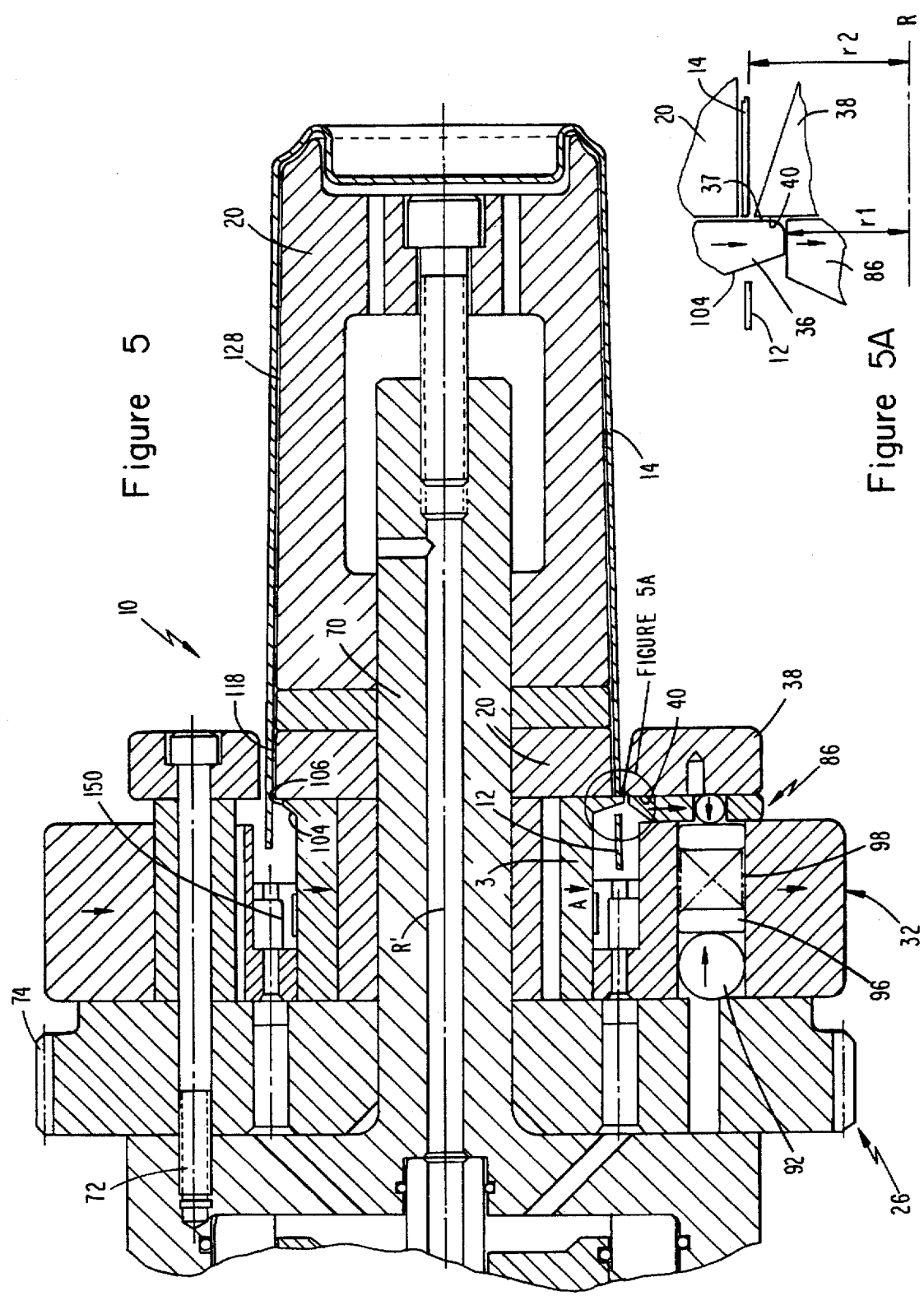
FIG. 5 is a sequential view similar to FIGS. 3 and 4 to depict the can body during trimming such as along sectional line 5—5 of FIG. 2.

As the trimmer cartridge 10 continues its movement about turret axis R, the cam surface 34 begins to ramp, as at 142, in a radially inward direction towards turret axis R, which has the effect of displacing the penetrator hub 32 in the radially inward direction towards axis R. This in turn displaces the inside penetrator 36 to an offset position as depicted in FIG. 5. This displacement occurs as a result of the annular clearances 76 formed between the penetrator hub 32 with the hub spacers 78 as well as the clearance 110 formed between the inside penetrator 36 with the penetrator spacer 112.

The aforesaid radial displacement causes the inside penetrator trimming edge 37 to be radially inwardly displaced to radius r1, relative to turret axis R, so that it extends beyond the can body side wall to create a shearing cutting action in cooperation with the outside knife edge 40 which remains centered on cartridge axis R' and therefore at the fixed radially outward location r2 from the turret axis R relative to the offset, radially inward location r1 of the inside penetrator trimming edge. The inside trimming edge 37 is caused to remain at its offset radially inward location r1 by a portion 34' of the cam surface which subtends a predetermined arcuate interval relative to turret axis R such that the differential between radii r1 and r2 (r1<r2) is preferably about 0.040 inches). Since the inside penetrator trimming edge 37 is located radially inward from the outside knife cutting edge 40 during co-rotation of the can and cartridge about cartridge axis R', this has the advantageous effect of causing the penetrator trimming edge and the outside knife cutting edge to generate shearing cutting forces along the entire periphery of the can open end to thereby trim the open end.

After trimming occurs, the cartridge 10 continues to rotate about axis R to a portion of the stationary ring cam 34 provided with a larger radius cam surface 34'. By virtue of the spring-biased centering ball mechanisms 92, the penetrator hub 32 is quickly restored to its centered position which in turn restores the inside penetrator 36 to its centered position out of cutting contact with the outside knife 38.

Figure 6:
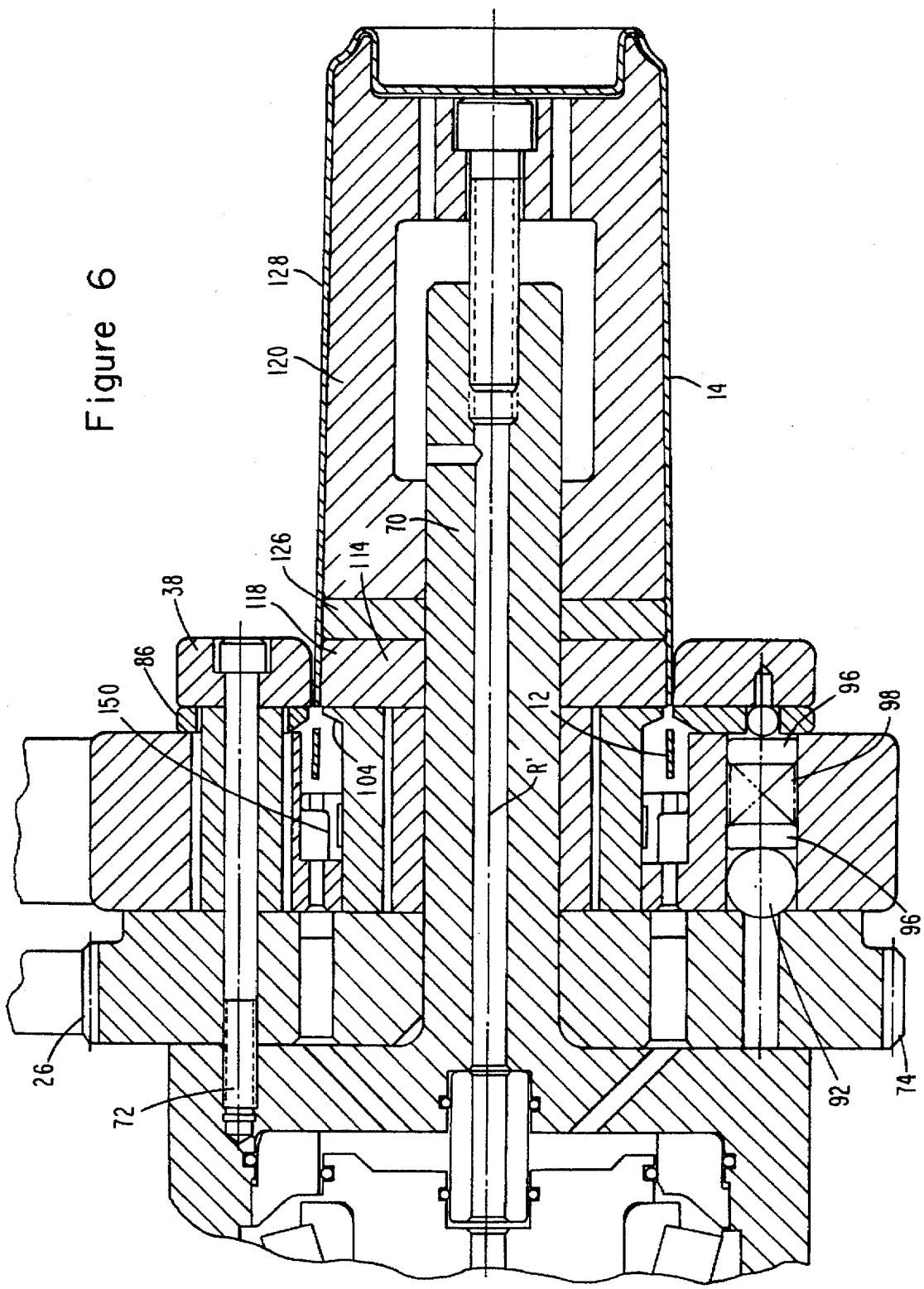
FIG. 6 is a view similar to FIGS. 3–5, along sectional line 6—6 of FIG. 2, after trimming has occurred and prior to forcible ejection of the trim ring from the cartridge.

The cartridge 10 now advances along the rotating turret 16 about axis R to a can discharge location D wherein pressurized air is now supplied through the vacuum passageways 134, 136, 138, 140 to rapidly eject the trimmed can from the mandrel 20. Further advancement of the cartridge 10 on the rotating turret 16 is operable to rotate the cartridge assembly into communication with a source of pressurized air which supplies pressurized air into the annular ejection chamber formed between the outside surface of the inside penetrator 36 and the inside, axially forwardly extending surface of the penetrator hub 32 to quickly advance a piston like trim ejector ring 150 in the forward direction into contact with the trim ring 12 (FIG. 6). This has the effect of rapidly ejecting the trim ring 12 through the ejection slot formed between the opposing surfaces 152 and 106 of the trim ring locator spacer 86 and the inside penetrator 36, respectively, to propel the trim ring from the cartridge 10. This pressurized air is supplied to the trim ring ejection chamber 130 from passageways (not shown) in spindle 54 through a series of slots 154 formed in the bottom wall 48 of the cartridge housing 44 which are in communication with a series of circumferentially spaced through bores 156 in the cartridge drive gear 26 in coaxial alignment with respective through bores 158 in the center portion 100 of the penetrator hub 32.

The trimmer cartridge 10 of the present invention is possessed of numerous advantages which enable it to rapidly trim can bodies with minimal, if any, generation of burrs and slivers. For example, incorporation of a mandrel 20 within the cartridge assembly 10 for supporting the can body 14 advantageously eliminates the need for separate base pad assemblies and base pad turrets and possible misalignment problems and accuracy in positioning associated therewith. Furthermore, the mandrel 20 facilitates the use of the grindable spacer 120 which easily allows the technician to set trim height and check trim quality in the tool room before the cartridge 10 is placed in a production machine.

In many prior art trimmers of which I am aware, it is critical to have a shearing clearance between the knives which is no greater than ten percent of the metal thickness. Considering that the metal thickness in this area of the can body side wall is about 0.006–0.008 inches, the resulting clearance must be no greater than 0.0006–0.0008 inches; otherwise, burrs will likely result. In the trimmer cartridge 10 of this invention, in contrast, the axial clearance between the outside knife cutting edge 40 and the inside penetrator trimming edge 37 may be as great as 0.005 inches without generating burrs. The invention therefore reduces the need for critical clearances. It is theorized that one reason for this is because the relatively gradual approach of the two cutting elements 37, 40 toward each other, over a long arc segment which may subtend an arcuate interval of about 45°, produces opposing forces on the metal being cut which are nearly radial. The more radial and less tangential these forces are, the less tendency it is believed they would have to cause circumferential bending or buckling of the can body or circumferential displacement of the can body with respect to the mandrel.

Since the outside knife 38 and the can 14 co-rotate together with the inside penetrator 36, there is no matching point which must be returned to once trimming is initiated.

The feature of centering the penetrator hub 32 with the spring-loaded ball centering arrangements 92 provides a fast and reliable mechanism for re-centering the inside penetrator 36 after trimming is completed. Once the inside penetrator 36 re-centers itself, the trim ring 12 is now located within the annular ejection chamber 130 which is centered with the tapered ejection slot defined between the trim ring locator spacer/outside knife on the outer side, and the forward tapered end of the inside penetrator/penetrator retainer on the inner side, each side being provided with tapered entrance surfaces providing a smooth transition from the chamber to the ejection slot which prevents the trim ring from hanging up on the outside knife surface.

In the present invention, the outside knife cutting edge 40 is sharp while the trimming edge. 37 defined by the front face of the inside penetrator with the axially extending cylindrical surface 106 is actually radiused (e.g., 0.003–0.006 inches). In this manner, trimming actually occurs from the inside out so that any burrs likely to be generated will be formed on the trim ring 12 and not on the can body 14.

Figure 7:
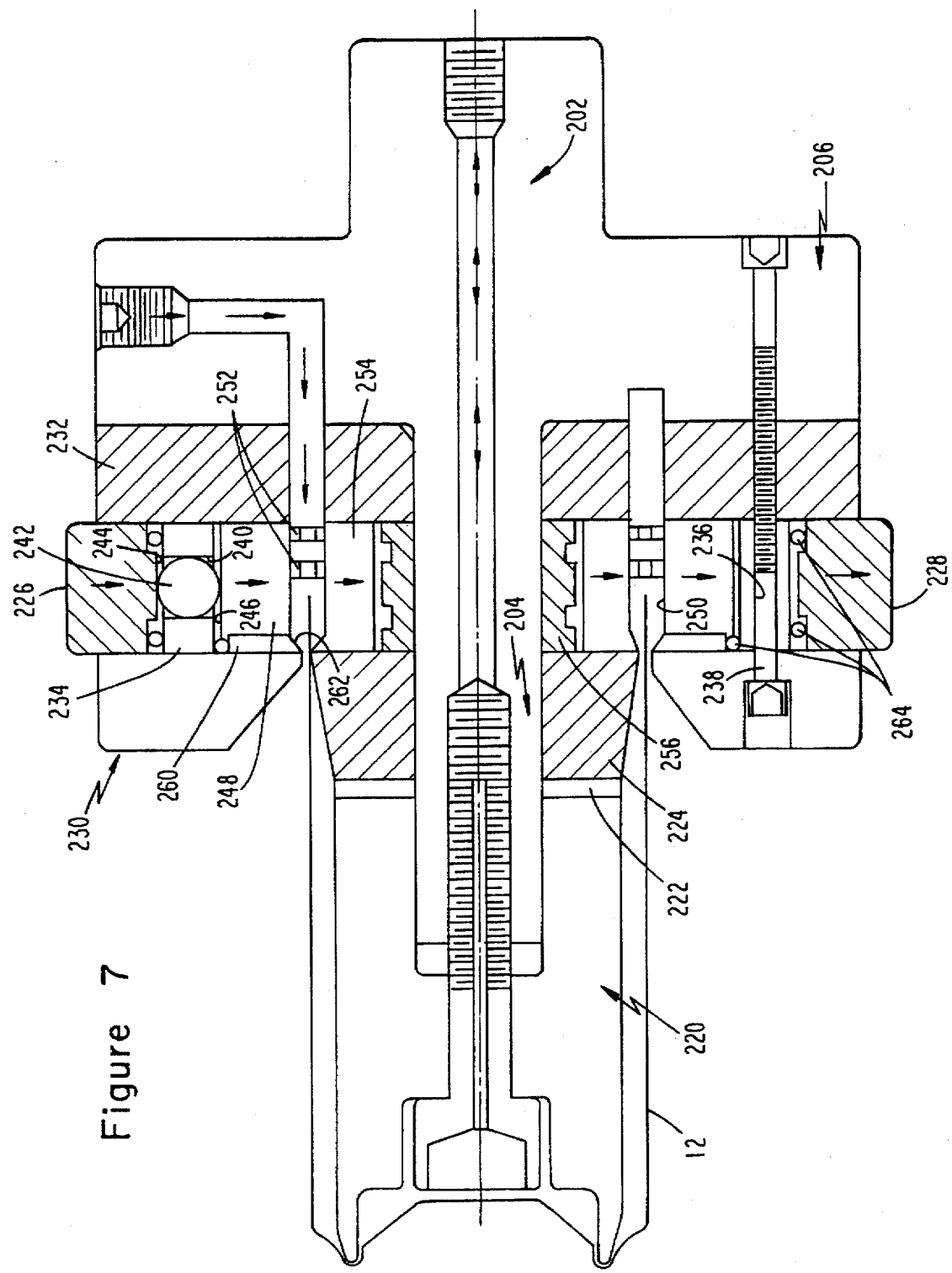
FIG. 7 is a sectional view, partly schematic, of a second embodiment of this invention.

FIG. 7 is a sectional view illustration of a second embodiment of a trimmer cartridge 200 wherein a cartridge spindle 202 is integrally formed with a support shaft 204 for co-rotation with a large diameter trimmer assembly mounting flange 206. The cartridge spindle 202 is adapted to be received within a set of chucking jaws (not shown) for rotating the trimmer cartridge 200 The support shaft portion 204 receives a mandrel 220 together with a grindable trim height spacer 222 and a penetrator retainer 224 which are functionally equivalent and structurally similar to the corresponding members in the preferred embodiment of FIG. 1.

Trimmer cartridge 200 is also comprised of a penetrator hub 226 having an outer cam follower surface 228 which may be acted upon in a radial direction in the same manner as that of trimmer cartridge 10, discussed supra. This penetrator hub 226 is mounted axially between an outside knife 230 and a wear plate 232 which are axially spaced parallel to each other through a ring-shaped spacer and bearing cage 234 formed with circumferentially spaced through bores 236 adapted to receive screws 238 extending through the knife, cage, wear plate and into the mounting flange for securing the parts together.

At alternating locations between the through bores 236 are formed a series of radial through bores 240 adapted to respectively receive a plurality of spherical balls 242 contacting an inner cylindrical surface 244 of the penetrator hub 226 on the outside and an outer cylindrical surface 246 of a spacer disk 248 located radially inwardly adjacent the spacer and bearing cage 234. The inner cylindrical surface 250 of this spacer 248 in turn slidably supports a stripper piston 252. A trim ring locator washer 260 is mounted between the front face of spacer 248 and outside knife 230 to define the outer inclined surface 262 of the ejection slot. The inside penetrator 254 is located radially inwardly adjacent the stripper piston 252 and a cylindrical inside spacer 256 is mounted on the support shaft 204 to maintain the required axial spacing between the penetrator retainer 224 and the wear plate 232.

The outside knife 230 and inside penetrator 254 operate in the same manner as the corresponding structures in the trimmer cartridge assembly 10 of the preferred embodiment. Unlike the preferred embodiment, however, radial inward displacement of the inside penetrator occurs via displacement of the cam follower 228, balls 242, cylindrical spacer 248, stripper piston 252 and inside penetrator 254 in that order. Re-centering occurs by the use of decompression of O-rings 264 disposed between the penetrator hub 226 and spacer 248 and bearing cage 234 as depicted in the drawing, following compression by squeezing of these O-rings which occurs as the penetrator hub is pressed radially inwardly into contact with the balls causing the latter to move within the radial slots 240 towards the cylindrical spacer.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. Apparatus for trimming a can body along a cylindrical open end thereof, comprising:
    (a) a shaft having a shaft axis;
    (b) an annular outer shearing element including a sharp cutting edge having an inner diameter greater than the outer diameter of the can body open end;
    (c) a cylindrical inner element operatively connected to the shaft and formed with a machined radiussed trimming edge having an outer diameter less than the inner diameter of the can body open end; wherein said inner element and said outer shearing element are coaxially mounted around the shaft and are sufficiently spaced from each other to receive the open end therebetween; and
    (d) a cam mounted to radially displace said inner element and outer shearing element in relation to each other and into a portion of the can body defining said open end to thereby shear the can body and ensure that a burr produced by the shearing action is on the trim ring formed during trimming and not on the can body.

2. The apparatus of claim 1, wherein the radiussed trimming edge is defined by a radius of approximately 0.03–0.06 inches.

3. The apparatus of claim 1, wherein said inner and outer elements are mounted for co-rotation with the shaft.

4. The apparatus of claim 3, further comprising a mandrel mounted on said shaft for supporting said can body for co-rotation with said shaft.

5. The apparatus of claim 1, further comprising a centering mechanism for centering said inner and outer elements on said shaft axis when said cam no longer exerts radial displacement forces against one of said inner and outer elements.

6. The apparatus of claim 5, further including a cam follower mounted on the shaft and which is responsive to a cam surface of said cam for radially displacing the inner element towards one side of and into contact with the can body so that a center of the inner element is radially offset from a center of the outer shearing element during trimming.

7. The apparatus of claim 6, wherein the cam follower is concentrically mounted on the shaft with the inner element.

8. The apparatus of claim 1, wherein said apparatus is a cartridge assembly including:
    (i) a cartridge housing having said shaft projecting therefrom;
    (ii) a cartridge spindle rotatably mounted through bearings to said housing;
    (iii) a cartridge retainer mounted to the spindle for connecting said cartridge assembly to a turret disk for co-rotation therewith about a turret axis of rotation which is parallel to a cartridge axis; and
    (iv) a drive gear mounted for co-rotation with the shaft, said drive gear meshing with a stationary ring gear mounted adjacent the turret disk to thereby rotate the inner and outer elements with the shaft about the shaft axis thereof during orbital rotation of the cartridge assembly about the turret axis.

9. The apparatus of claim 8, further including a penetrator hub mounted on the shaft concentrically about the inner element which is in the form of an inside penetrator having the trimming edge, said penetrator hub including a cylindrical cam follower surface engageable with a cam surface formed on said cam, said cam being a stationary cam ring mounted adjacent the stationary ring gear, wherein radial inward displacement of the penetrator hub under camming action causes corresponding radial inward displacement of the trimming edge toward the turret axis so that the trimming edge intersects the can body and overlaps with the cutting edge of the outer shearing element to generate cutting forces which trim the can body as said trimming edge is maintained by camming action radially closer to the turret axis than the cutting edge during orbital movement of the cartridge assembly and rotation of the inner and outer elements about the shaft axis.

10. Apparatus of claim 9, wherein said inner element and outer shearing element, when in centered position on the shaft axis, define an ejection slot spaced forwardly from an annular trim ring discharge chamber formed between the inner and outer elements.

11. Apparatus of claim 10, further comprising forcible ejection means in said chamber, responsive to pressurized air, for propelling a trim ring through said chamber toward said ejection slot to remove the trim ring from the apparatus.

12. Apparatus of claim 11, wherein a forward end wall defining a front end of the chamber and an entrance to the ejection slot is formed by a pair of oppositely and forwardly inclined surfaces radially spaced from each other to define the beginning of the ejection slot and such that the trim ring being ejected from the chamber through the slot is guided by said inclined surfaces into the slot.

13. The apparatus of claim 8, further comprising a mandrel mounted to said shaft for supporting said can body for co-rotation with said shaft.

14. The apparatus of claim 13, further comprising a grindable trim height spacer mounted on said shaft axially between said mandrel and said inner and outer shearing elements, said trim height spacer being operable to control the extent to which the can body open end is trimmed.

15. The apparatus of claim 13, further comprising a series of vacuum passageways extending through the cartridge spindle and the shaft and the mandrel in communication with a bottom face of the mandrel to apply a vacuum to said bottom face to securely seat the can body on said mandrel.

16. Apparatus of claim 1, wherein said inner element and said outer shearing element, when in centered position on the shaft axis, define an ejection slot spaced axially forwardly from an annular trim ring discharge chamber formed between the inner and outer elements.

17. Apparatus of claim 16, further comprising forcible ejection means in said chamber, responsive to pressurized fluid, for propelling a trim ring through said chamber toward said ejection slot to remove the trim ring from the apparatus.

18. Apparatus for trimming a can body along a cylindrical open end thereof, comprising:
(a) a support shaft;
(b) an annular outer shearing element having an inner diameter greater than the outer diameter of the can body open end;
(c) a cylindrical inner element having an outer diameter less than the inner diameter of the can body open end; wherein said inner element and said outer shearing element are coaxially mounted around the shaft and are sufficiently spaced from each other to receive the open end therebetween; and
(d) a displacement arrangement means for radially displacing said inner and outer elements in relation to each other and into a portion of the can body defining said open end to thereby shear the can body,
wherein said apparatus is a cartridge assembly including:
(i) a cartridge housing having said support shaft projecting therefrom;
(ii) a cartridge spindle rotatably mounted through bearings to said housing;
(iii) a cartridge retainer mounted to the spindle for connecting said cartridge assembly to a turret disk for co-rotation therewith about a turret axis of rotation which is parallel to a cartridge axis; and
(iv) a drive gear mounted for co-rotation with the shaft, said drive gear meshing with a stationary ring gear mounted adjacent the turret disk to thereby rotate the inner and outer elements with the shaft about a shaft axis thereof during orbital rotation of the cartridge assembly about the turret axis,
wherein said displacement arrangement means further includes a penetrator hub mounted on the shaft concentrically about the inner element which is in the form of an inside penetrator having a trimming edge, said penetrator hub including a cylindrical cam follower surface engageable with a cam surface formed on a stationary cam ring mounted adjacent the stationary ring gear, wherein radial inward displacement of the penetrator hub under camming action causes corresponding radial inward displacement of the trimming edge toward the turret axis so that the trimming edge intersects the can body and overlaps with a cutting edge of the outside shearing element to generate cutting forces which trim the can body as said trimming edge is maintained by camming action radially closer to the turret axis than the cutting edge during orbital movement of the cartridge assembly and rotation of the inner and outer elements about the shaft axis, wherein said penetrator hub is mounted to the drive gear with plural screws respectively passing through a series of circumferentially spaced first through bores formed in the hub, said screws extending through spacers in the first through bores which permit radial displacement of the hub relative to the shaft axis.

19. The apparatus of claim 18, wherein said outer shearing element is an outside knife extending around the can body axially forwardly of the penetrator hub, said knife being mounted around said shaft with said screws, said spacers axially spacing the knife from the trimming edge of the inside penetrator.

20. The apparatus of claim 19, further comprising a centering mechanism for centering said inner and outer elements on said shaft axis when said cam ring no longer exerts radial displacement forces against said penetrator hub, wherein said penetrator hub includes a second series of through bores alternating between the first through bores to receive a plurality of centering members of said centering mechanism for centering said inside penetrator trimming edge on said shaft axis when camming radial displacement forces are not acting against said penetrator hub.

21. The apparatus of claim 20, wherein said centering members respectively comprise a spherical ball and a spring disposed in each second through bore, said spherical ball being operable to project axially slightly from one of the axial faces of the penetrator hub and into a seating bore formed coaxially adjacent the associated second through bore, whereby said spherical balls are normally urged into seating contact with said seating bores by said springs when no radial displacement camming forces are exerted against the penetrator hub and wherein said balls are operable to retract within the second through bores when radial displacement camming forces radially displace the penetrator hub relatively to the seating bores such that when said radial displacement camming forces are released from the penetrator hub, said spring biased balls are operable to re-center the penetrator hub and thereby the trimming edge relative to the shaft axis.

22. Apparatus for trimming a can body along a cylindrical open end thereof, comprising:
(a) a support shaft;
(b) an annular outer shearing element having an inner diameter greater than the outer diameter of the can body open end;
(c) a cylindrical inner element having an outer diameter less than the inner diameter of the can body open end;

wherein said inner element and said outer shearing element are coaxially mounted around the shaft and are sufficiently spaced from each other to receive the open end therebetween; and (d) a displacement arrangement means for radially displacing said inner and outer elements in relation to each other and into a portion of the can body defining said open end to thereby shear the can body, wherein said inner element and said outer shearing element, when in centered position on a support shaft axis, define an ejection slot spaced axially forwardly from an annular trim ring discharge chamber formed between the inner and outer elements, further comprising forcible election means in said chamber, responsive to pressurized fluid, for propelling a trim ring through said chamber toward said election slot to remove the trim ring from the apparatus, wherein a forward end wall defining a front end of the chamber and an entrance to the ejection slot is formed by a pair of oppositely and forwardly inclined surfaces radially spaced from each other to define the beginning of the ejection slot and such that the trim ring being ejected from the chamber through the slot is guided by said inclined surfaces into the slot.

23. Apparatus for trimming a can body along a cylindrical open end thereof, said apparatus comprising:

a cartridge assembly including a cartridge spindle for mounting the cartridge assembly to a support structure;

a support shaft operatively connected to the cartridge spindle through bearings so as to be rotatable relative to the spindle about a support shaft axis which defines a trimming axis on the cartridge assembly;

first and second elements being respectively formed with a machined radiussed trimming edge and a sharp cutting edge, said first and second elements being mounted coaxially around said support shaft and being radially spaced from each other to receive the open end of the can body therebetween; and a displacement arrangement means for radially displacing said trimming edge, relative to the support shaft axis, into a portion of the can body defining said open end to thereby shear the can body with the cutting edge.

24. The apparatus of claim 23, wherein said cartridge assembly is mounted to a turret disk through the spindle such that the cartridge assembly is co-rotatable with the turret disk about a turret axis of rotation which is parallel to the cartridge trimming axis; and means for rotating the inner and outer elements about the support shaft axis during orbital rotation of the cartridge assembly about the turret axis.

25. Apparatus of claim 24, wherein said displacement arrangement means further includes a penetrator hub mounted on the support shaft concentrically about the first element which is in the form of an inside penetrator having said trimming edge, said penetrator hub including a cylindrical cam follower surface engageable with a cam surface formed on a stationary cam ring mounted adjacent a stationary ring gear, wherein radial inward displacement of the penetrator hub under camming action causes corresponding radial inward displacement of the trimming edge toward the turret axis so that the trimming edge intersects the can body and overlaps with the cutting edge of the second element to generate cutting forces which trim the can body as said trimming edge is maintained by camming action radially closer to the turret axis than the cutting edge during orbital movement of the cartridge assembly and rotation of the first and second elements about the support shaft axis.

26. Apparatus for trimming a can body along a cylindrical open end thereof, said apparatus comprising:

a cartridge assembly including a cartridge spindle for mounting the cartridge assembly to a support structure;

a support shaft operatively connected to the cartridge spindle through bearings so as to be rotatable relative to the spindle about a support shaft axis which defines a trimming axis on the cartridge assembly;

first and second elements being respectively formed with a trimming edge and a cutting edge, said first and second elements being mounted coaxially around said support shaft and being radially spaced from each other to receive the open end of the can body therebetween; and a displacement arrangement means for radially displacing said inner and outer elements in relation to each other and into a portion of the can body defining said open end to thereby shear the can body, wherein said cartridge assembly is mounted to a turret disk through the spindle such that the cartridge assembly is co-rotatable with the turret disk about a turret axis of rotation which is parallel to the cartridge trimming axis; and means for rotating the inner and outer elements about the shaft axis during orbital rotation of the cartridge assembly about the turret axis, wherein said displacement arrangement means further includes a penetrator hub mounted on the support shaft concentrically about the first element which is in the form of an inside penetrator having said trimming edge, said penetrator hub including a cylindrical cam follower surface engageable with a cam surface formed on a stationary cam ring mounted adjacent a stationary ring gear, wherein radial inward displacement of the penetrator hub under camming action causes corresponding radial inward displacement of the trimming edge toward the turret axis so that the trimming edge intersects the can body and overlaps with the cutting edge of the second element to generate cutting forces which trim the can body as said trimming edge is maintained by camming action radially closer to the turret axis than the cutting edge during orbital movement of the cartridge assembly and rotation of the first and second elements about the support shaft axis, wherein said penetrator hub is mounted to a drive gear with plural screws respectively passing through a series of circumferentially spaced first through bores formed in the hub, said screws extending through spacers in the first through bores which permit radial displacement of the hub relative to the shaft axis.

27. Apparatus for trimming a can body along a cylindrical open end thereof, comprising:

(a) a support mechanism having a support mechanism axis;

(b) an annular outer shearing element having an inner diameter greater than the outer diameter of the can body open end;

(c) a cylindrical inner element having an outer diameter less than the inner diameter of the can body open end; wherein said inner element and said outer shearing element are coaxially mounted for support by the support mechanism and are sufficiently spaced from each other to receive the open end therebetween; and (d) a displacement arrangement mechanism operatively connected to the support mechanism for radially displacing said inner and outer elements in relation to each other and into a portion of the can body defining said open end to thereby shear the can body, wherein said inner element and said outer shearing element, when in centered position on the support mechanism axis, define an ejection slot spaced axially forwardly from an annular trim ring discharge chamber formed between the inner and outer elements, further comprising a forcible ejection mechanism in said chamber, responsive to pressurized fluid, for propelling a trim ring through said chamber toward said ejection slot to remove the trim ring from the apparatus, wherein said chamber is an annular chamber coaxial with the support mechanism and the ejection slot is formed by a pair of oppositely and forwardly inclined surfaces radially spaced from each other such that the trim ring being ejected from the chamber is freely slidable through the chamber and is guided by said inclined surfaces of the slot.

* * * * *